US008727684B1

(12) United States Patent
Woods et al.

(10) Patent No.: US 8,727,684 B1
(45) Date of Patent: May 20, 2014

(54) NUT RETENTION DEVICE

(71) Applicant: General Electric Company, Schenectady, NY (US)

(72) Inventors: Steven Charles Woods, Easley, SC (US); Matthew Paul Berkebile, Mauldin, SC (US); Bradford David Borchert, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/758,274

(22) Filed: Feb. 4, 2013

(51) Int. Cl.
*F16B 39/282* (2006.01)

(52) U.S. Cl.
USPC .......................................... 411/192; 411/201

(58) Field of Classification Search
USPC ......... 411/191, 192, 195, 197, 432, 512, 523, 411/529, 999, 190, 201, 204
See application file for complete search history.

(56) References Cited

U.S. PATENT DOCUMENTS 405,632 A 6/1889 Warren
545,776 A 9/1895 Coleman
792,360 A * 6/1905 Stagner ......................... 411/192
830,055 A 9/1906 Doty
875,438 A * 12/1907 Ketteringham ............... 411/192
896,883 A 8/1908 Bailey
923,264 A 6/1909 Hathcox
1,103,337 A 7/1914 Albin
1,270,734 A * 6/1918 Hennings ...................... 411/197
1,286,457 A 12/1918 Warner
1,287,371 A * 12/1918 McClay et al. ............... 411/222
1,334,887 A * 3/1920 Carson .......................... 411/191
1,361,838 A 12/1920 Doty
1,414,188 A 4/1922 Jones et al.
1,816,192 A 7/1931 Nagano
2,351,065 A 6/1944 Poupitch
4,286,642 A * 9/1981 Keatley ......................... 411/112
4,848,089 A * 7/1989 Cramer ........................... 60/752
5,417,530 A * 5/1995 Grossner ....................... 411/258
6,241,441 B1 6/2001 Erb
8,113,754 B2 2/2012 Dahl et al.
8,206,070 B2 6/2012 Walker
2009/0226247 A1 9/2009 Taylor
2009/0311070 A1* 12/2009 Walker .......................... 411/171

* cited by examiner

*Primary Examiner* — Roberta Delisle
(74) *Attorney, Agent, or Firm* — Ernest G. Cusick; Hoffman Warnick LLC

(57) ABSTRACT

Embodiments of the invention relate generally to nut retention devices and, more particularly, to nut retention devices having a strap that can be fixed to a distal end of a threaded member without damage to the threaded member or nut, thereby permitting their reuse. In one embodiment, the invention provides a nut retention device comprising: a body having a nut engaging opening; and a deformable strap extending from the body, wherein, in an operative state, the nut engaging opening immovably receives a nut that is threaded on a threaded member and the strap is positioned to fixedly engage the threaded member to retain the nut.

20 Claims, 5 Drawing Sheets

100
190
180
120
122
170

330
300
390
370
380
320

122
120
128
100
110
112

220
238
200
212
210

NUT RETENTION DEVICE

BACKGROUND OF THE INVENTION

Embodiments of the invention relate generally to nut retention devices and, more particularly, to nut retention devices having a strap that can be fixedly engaged to a distal end of a threaded member without damage to the threaded member or nut, thereby permitting their reuse.

Nuts and threaded members, such as bolts, are employed to fasten a wide variety of machine components. In many applications, however, operation of the machine causes vibrational or other stresses on the threaded member assembly, which may result in loosening or loss of the nut. In such applications, devices may be employed to retain the nut on the threaded member, preventing its loosening or loss. Such devices typically require inclusion with the threaded member assembly stock or fixed attachment to the nut or threaded member, causing damage to either or both and preventing their reuse after disassembly. For example, many such devices require that the threaded member be cut in order to disassemble the threaded member assembly, requiring replacement of the entire assembly.

This process can become quite expensive in applications where the nut and threaded member assemblies are themselves expensive, such as in gas turbine applications. This expense is exacerbated where periodic or frequent disassembly and reassembly of the nut and threaded member assembly is required, such as, for example, machine maintenance or the replacement of machine parts. Each disassembly requires destruction of the nut and threaded member assembly in place and replacement with a new nut and threaded member assembly, to which a new retention device is then applied.

In addition, some applications simply require a greater degree of retentive strength and/or additional points of retention. For example, nut and threaded member assemblies employed in gas turbine applications, particularly in connection with gas turbine combustion components such as the mounting of combustion transition pieces in a gas turbine, are subjected to high stresses during operation of the gas turbine. This situation requires not only a greater degree of retention, but often the use of very strong, expensive nut and threaded member assemblies. While the use of nut retention devices is often necessary in such situations, the destruction of such expensive nut and threaded member assemblies each time disassembly is required greatly increases the cost of operation of the gas turbine.

BRIEF DESCRIPTION OF THE INVENTION

In one embodiment, the invention provides a nut retention device comprising: a body having a nut engaging opening; and a deformable strap extending from the body, wherein, in an operative state, the nut engaging opening immovably receives a nut that is threaded on a threaded member and the strap is positioned to fixedly engage the threaded member to retain the nut.

In another embodiment, the invention provides a nut retention system for retaining a nut on a threaded member coupling to a component of a gas turbine, the nut retention system comprising: a body having a nut engaging opening; and a deformable strap extending from the body, wherein, in an operative state, the nut engaging opening immovably receives the nut that is threaded on the threaded member coupling to the component and the strap is positioned to fixedly engage the threaded member to retain the nut.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
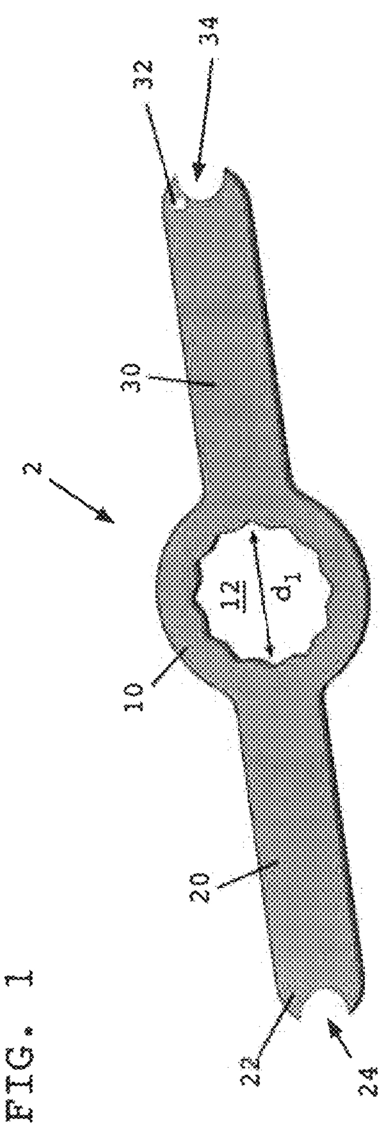
FIG. 1 shows a perspective view of a nut retention device according to an embodiment of the invention.

FIG. 1 shows a perspective view of a nut retention device 2 according to an embodiment of the invention. Nut retention device 2 includes a body 10 having a nut engaging opening 12 for receiving a nut (not shown) and a strap 20 extending from body 10. In one embodiment, a single strap 20 extends from body 10 (see FIGS. 7 and 8), and in an alternative embodiment, a pair of straps 20, 30 may extend from opposite sides of body 10. As shown in FIG. 1, straps 20, 30 are shown extending from body 10 substantially opposite each other, although this is not essential. In addition, as will be described in greater detail below, although the embodiment shown in FIG. 1 is shown having pair of straps 20, 30, embodiments with more straps or as few as one strap may be employed and are within the scope of the invention.

Nut engaging opening 12 has a shape configured to non-rotationally engage a cross-sectional shape of a nut to be retained. In some embodiments, the shape of opening 12 may substantially correspond with that of the nut, but that is not necessary in all instances. Accordingly, nut engaging opening 12 may have any number of shapes, depending on the particular application, as will be apparent to one skilled in the art. Generally, nut engaging opening 12 has a diameter $d_1$ substantially equal to a diameter or width of the nut to be retained, such that once so retained, the nut is immovably received by and restricted from movement within nut engaging opening 12. As will be explained in greater detail below, a nut retained using a device according to the invention may have more than one diameter or width. That is, a nut may be tapered, such that a diameter or width at one end of the nut is different from a diameter or width at another end or position along the nut.

As shown in FIG. 1, each strap 20, 30 includes a distal end 22, 32, respectively. At least distal end 22, 32 of each strap 20, 30 may include a weldable material. Often, such a weldable material is a metal, such as steel or a nickel-based alloy. However, as used herein, "weldable" is intended to have a broader meaning and encompass materials that may be joined to one or more other component such as by, for example, metal welding, melting, chemical dissolution, etc.

Figure 2:
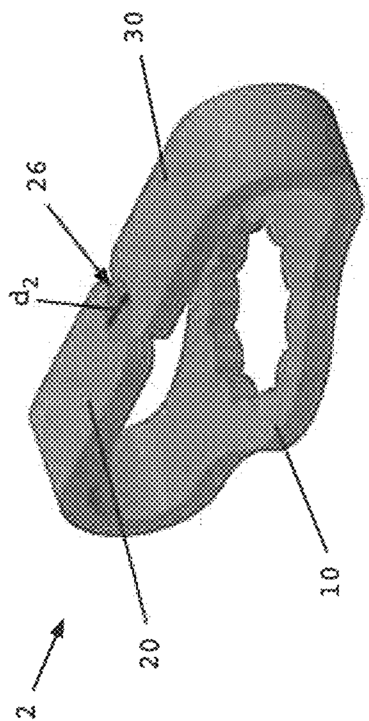
FIG. 2 shows a perspective view of the nut retention device of FIG. 1 as it would be employed in an operative state.

Straps 20, 30 are deformable, such that at least a portion of strap 20, 30 may be positioned to fixedly engage a threaded member 80 (FIG. 5) in an operative state. As shown in FIG. 2, in an operative state, this position may place distal end 22, 32 of straps 20, 30, respectively, above nut engaging opening 12. In some embodiments, distal ends 22, 32 of each strap 20, 30 are positioned above nut engaging opening 12 and welded to a threaded member such as a bolt or similar threaded member to which the retained nut is threadably or otherwise attached. To facilitate welding to the threaded member, distal ends 22, 32 may include notches 24, 34, which allow passage of the weld material to the threaded member. FIG. 2 shows nut retention device 1 with straps 20, 30 deformed to an operative state. Together, notches 24, 34 (FIG. 1) form a notch opening 26 above nut engaging opening 12. Notch opening 26 preferably has a diameter $d_2$ that is less than diameter $d_1$ of nut engaging opening 12. As shown in FIGS. 1 and 2, notches 24, 34 are shown having a substantially semicircular shape, although this is neither necessary nor essential. Notches having other shapes may be employed, as will be apparent to one skilled in the art.

Figure 3:
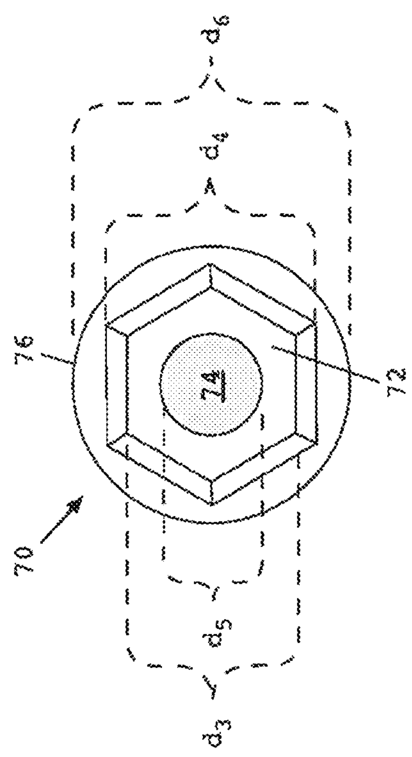
FIGS. 3 and 4 show top and perspective views of an illustrative nut that may be retained using devices of the invention.
Figure 4:
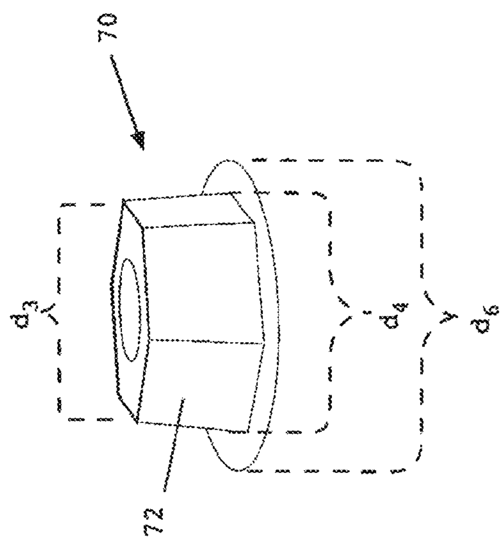

FIGS. 3 and 4 show, respectively, top and perspective views of an illustrative nut 70 that may be retained using devices according to embodiments of the invention. Referring to FIG. 3, nut 70 includes a body 72 having a tapered shape, such that a diameter or width $d_3$ nearer one end of body 72 is less than a diameter or width $d_4$ nearer the opposite end of body 72. Nut 70 may include an inner, threaded channel 74, through which a threaded member may be threaded. Alternatively, nut 70 may also include other engaging mechanisms for engaging a threaded member now known or later developed. In any event, channel 74 has a diameter $d_5$ substantially equal to the diameter of the threaded member to be threaded or otherwise attached therethrough. In addition, some nuts, such as nut 70 in FIGS. 3 and 4, include a collar 76 or similar feature having a diameter or width $d_6$ greater than any diameter of body 72.

Figure 5:
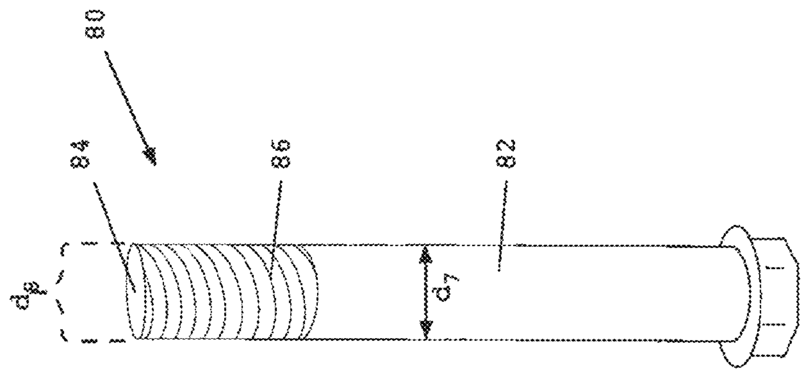
FIG. 5 shows a perspective view of an illustrative threaded member for use with the nut of FIGS. 3 and 4.

FIG. 5 shows a perspective view of a threaded member 80 suitable for use in a nut and threaded member assembly including nut 70 (FIGS. 3 and 4). In this example, threaded member 80 takes the form of a bolt. For example, threaded member 80 may includes a shaft 82 having a diameter $d_8$ or width. Shaft 82 includes a threaded portion 86, the diameter d8 of which may be the same as or different from diameter $d_7$ of shaft 82. Shaft 82 terminates at a distal end 84.

Figure 6:
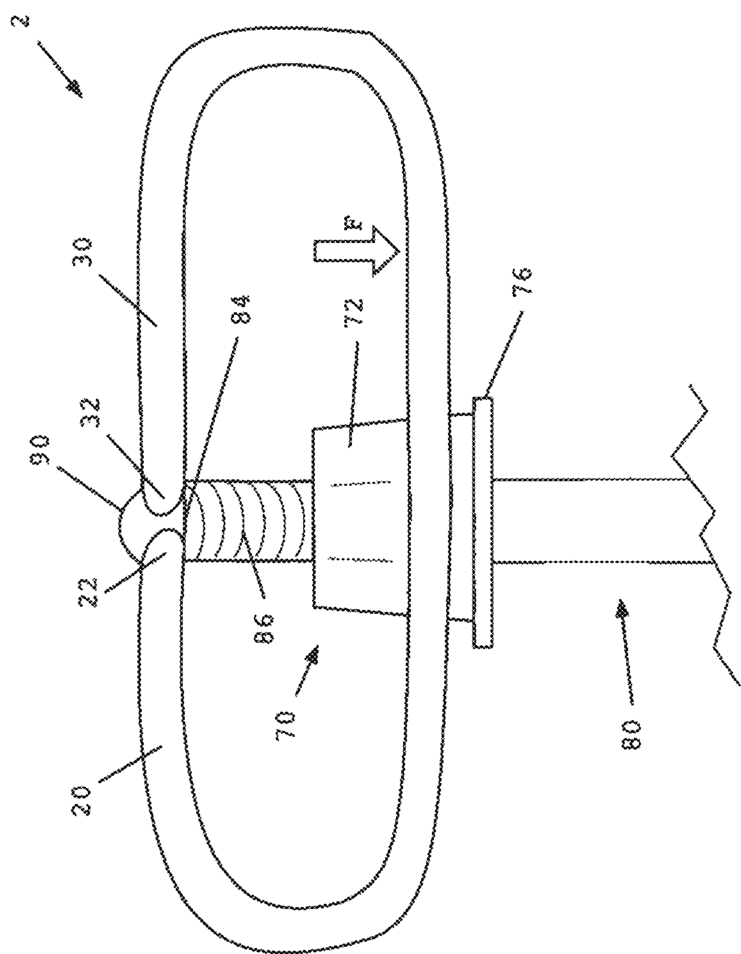
FIG. 6 shows a side view of a nut retention device according to one embodiment of the invention used with the nut of FIGS. 3 and 4 and the threaded member of FIG. 5.

FIG. 6 shows a side view of nut retention device 2 in an operative state in conjunction with assembled nut 70 and threaded member 80. Body 72 of nut 70 has been passed through nut engaging opening (obscured) to a point at which the diameter of body 72 substantially equals diameter of nut engaging opening, thereby retaining nut 70 in a substantially fixed position within the nut engaging opening.

Each strap 20, 30 is deformed, such that distal, terminal ends 22, 32, respectively, are positioned adjacent distal end 84 of threaded member 80. In one embodiment, a weld 90 may be applied to distal ends 22, 32 of straps 20, 30, respectively, as well as distal end 84 of threaded member 80, thereby fixedly engaging straps 20, 30 to threaded member 80. The material of weld 90 will depend, for example, on the material (s) of distal ends 22, 32 and threaded member 80. Where, for example, distal ends 22, 32 and threaded member 80 include steel, a nickel-alloy, or other suitable metal, weld material 90 may include a compatible metal weld material. Weld 90, as depicted in FIG. 6, may include embodiments of the invention having a notch 24, 34 (FIG. 1) at either or both distal ends 22, 32 or embodiments in which distal ends 22, 32 include no such feature and are substantially blunt or flush. In the case of the latter, distal ends 22, 32 may be positioned atop distal end 84 of threaded member 80, but slightly spaced from each other to facilitate formation of weld 90 atop distal end 84 of threaded member 80.

Embodiments of the invention, such as that shown in FIG. 6, provide multiple retention features. Weld 90 fixedly engages straps 20, 30 to threaded member 80, thereby restricting movement of nut retention device 2 and nut 70 and preventing the loss of nut 70. In addition, the passing of nut 70 into nut engaging opening 12 (FIG. 1) retains nut 70 on threaded member 80. Further, the stiffness of the material(s) of nut retention device 2, particularly in the configuration shown in FIG. 6, with straps 20, 30 deformed and secured to threaded member 80 by weld 90, imparts a force F against nut 70 in response to any movement by nut 70 in an opposing direction. The amount of force F can be customized based on, among other things, the materials used, or the amount of flex imparted to straps 20, 30 as they are fixedly engaged to threaded member 80.

Embodiments of the invention provide the additional feature of being amenable to disassembly without causing damage to threaded member 80, nut 70 or nut retention device 2. For example, weld 90 may be removed, using methods and techniques known in the art, without the need to cut or otherwise damage threaded member 80. Nut retaining device 2 may then be removed from the assembled nut 70 and threaded member 80, which themselves may then be disassembled. The entire assembly of nut 70, threaded member 80, and nut retention device 2 may then be reassembled without the need to replace any components.

Figure 7:
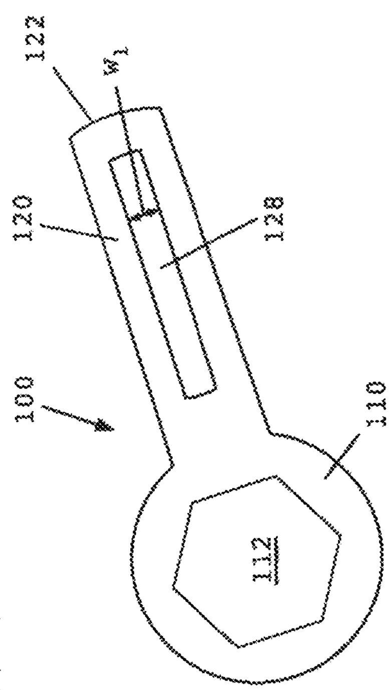
FIG. 7 shows a top view of a nut retention device according to another embodiment of the invention.

Other embodiments and arrangements of features are possible, of course. For example, FIG. 7 shows a top view of a nut retention device 100 having a single strap 120. Distal end 122 of strap 120 contains no notch and is substantially blunt, but a slot 128 is provided along a portion of a length of strap 120, through which a weld may be formed. Slot 128 has a width $w_1$ that, in some embodiments of the invention, is less than or equal to a diameter of the distal end of threaded member 80 (FIG. 6) to which strap 120 will be welded. As such, slot 128 serves a similar function as does notch opening 26 (FIG. 2). The embodiment shown in FIG. 7 provides an advantage in that the point at which the weld will be formed, and consequently the degree and place(s) at which strap 120 is deformed, may be varied. Similarly, the amount of force F may be varied in this fashion.

Figure 8:
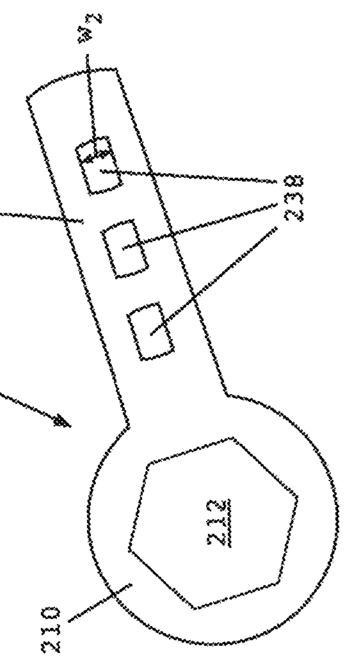
FIG. 8 shows a top view of a nut retention device according to still another embodiment of the invention.

FIG. 8 shows a top view of another embodiment of the invention of a nut retention device 200. Here, a strap 220 includes a plurality of strap openings 238, although other embodiments may include a single strap opening. The arrangement shown in FIG. 8 permits use of nut retention device 200 in a manner similar to the embodiment shown in FIG. 7. Rather than the point at which weld will be formed being continuously variable along the length of slot 128, though, the plurality of strap openings 238 permits variable but fixed points at which the weld may be made. Each of the plurality of strap openings 238 has a width $w_2$ that, in some embodiments of the invention, is less than or equal to a diameter of the distal end of the threaded member to which strap 220 will be welded.

The embodiments shown in FIGS. 7 and 8 depict single strap nut retention devices 100, 200. It should be appreciated, however, that the arrangements of straps 120, 220, respectively, in such embodiments are equally applicable to embodiments having more than one strap.

Figure 9:
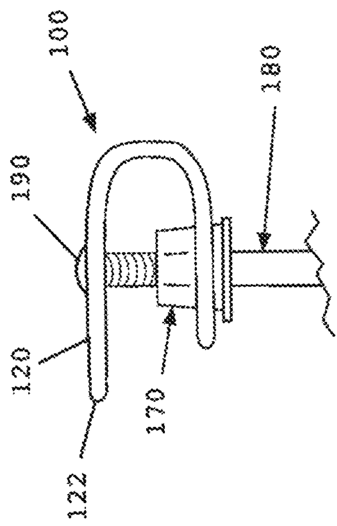
FIG. 9 shows a side view of the nut retention device of FIG. 7 in conjunction with a nut and threaded member.

FIG. 9 shows a side view of nut retention device 100 of FIG. 7 in an operative state in conjunction with assembled nut 170 and threaded member 180. As can be seen, weld 190 is made through slot 128 (FIG. 7), fixedly engaging strap 120 to threaded member 180. Due to the variability in the point at which weld 190 is made, distal end 122 of strap 120, in use, may extend beyond distal end (obscured) of threaded member 180.

Figure 10:
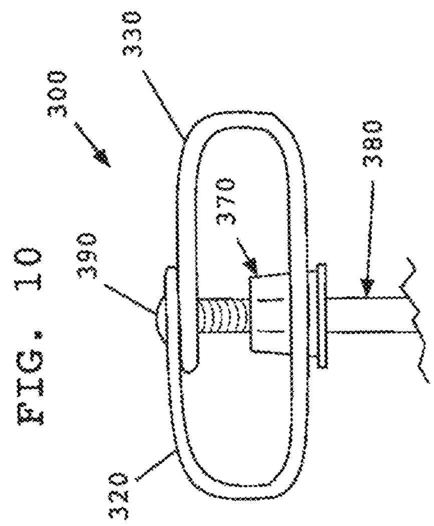
FIG. 10 shows a side view of a nut retention device according to yet another embodiment of the invention in conjunction with a nut and threaded member.

FIG. 10 shows a side view of a similar nut retention device 300 having two straps 320, 330 in conjunction with assembled nut 370 and threaded member 380. As can be seen in FIG. 10, in such an embodiment, straps 320, 330 may be positioned such that they overlap above distal end (obscured) of threaded member 380. Accordingly, weld 390 is made through slots or strap openings in each strap 320, 330 and onto distal end of threaded member 380.

Figure 11:
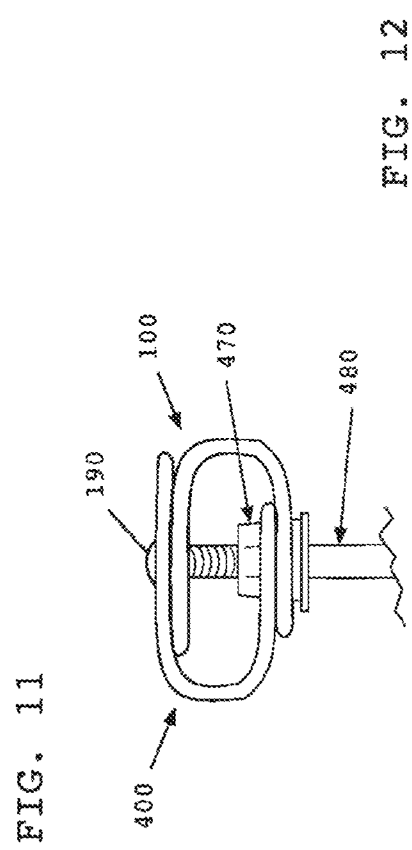
FIG. 11 shows a side view of a pair of nut retention devices of FIGS. 7 and 9 in conjunction with a nut and threaded member.

FIG. 11 shows a side view of a pair of nut retention devices 100, 400 of FIG. 9 in conjunction with assembled nut 470 and threaded member 480. Although two nut retention devices 100, 400 are shown in FIG. 11, any number of such devices may be employed. In addition, while nut retention devices 100, 400 are shown as positioned substantially opposite each other in FIG. 11, other arrangements are possible. For example, in some circumstances, such as where nearby obstructions must be avoided, nut retention devices 100, 400 could be arranged at less than 180° from each other, such as, for example, 90° from each other.

As noted above, nut retention devices according to various embodiments of the invention may include a number of materials, depending on the particular applications in which they will be employed. These include any weldable metal, including, for example, steel, nickel, copper, tungsten, aluminum, palladium, platinum, iron, titanium, and alloys thereof. In addition, where the threaded member used includes or is formed from a plastic material, such as polypropylenes, polyethylenes, nylons, polytetrafluoroethylene, or acrylonitrile butadiene styrene, nut retention devices according to embodiments of the invention, or the distal ends of their straps, may include or be formed of a similar material. In such embodiments, the threaded member and distal ends of the straps may be welded or otherwise joined together using a welding material, thermal fusion, chemical fusion, or a similar process.

Similarly, embodiments of the invention may be used in any number of applications. As noted above, nut and threaded member assemblies in gas turbine applications require additional points of retention and greater retentive strength, both of which are provided by embodiments of the invention. Embodiments of the invention are particularly suitable for use in retaining nuts in nut and threaded member assemblies used to secure gas turbine combustion components, such as combustion transition pieces. As noted above, these nut and threaded member assemblies are subjected to high stresses during operation of the gas turbine and, as a consequence, often comprise expensive nickel-alloy components. Embodiments of the invention obviate the current need to damage and replace the threaded member or entire nut and threaded member assembly each time the nut and threaded member assembly is disassembled.

Figure 12:
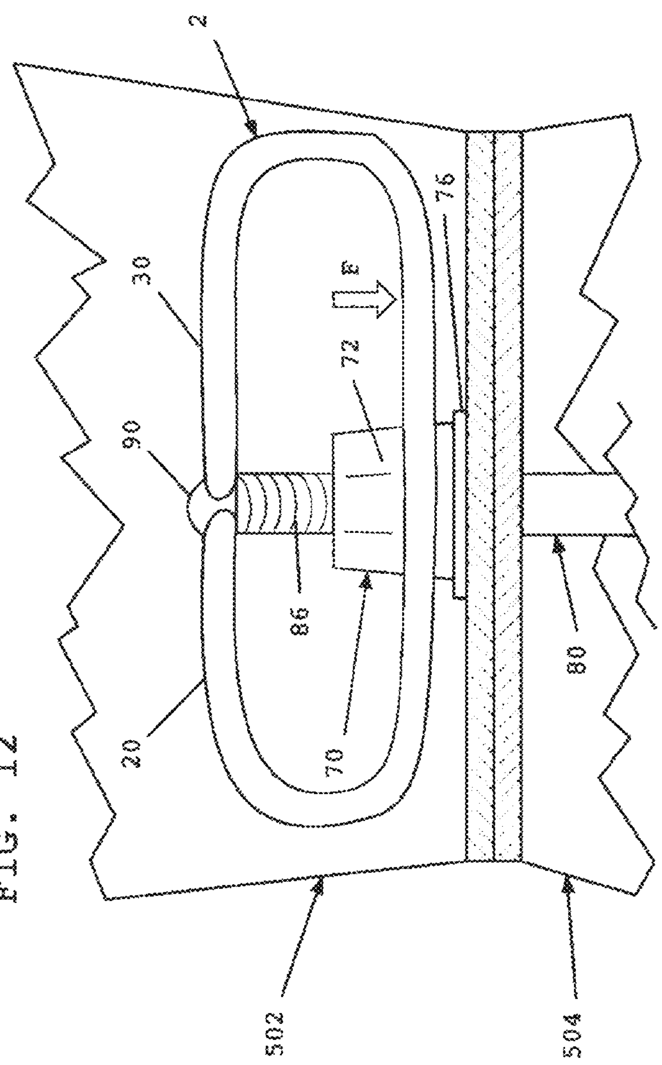
FIG. 12 shows a side view of the nut retention device of FIG. 6 in conjunction with a nut and threaded member as used in connecting a pair of gas turbine components.

For example, FIG. 12 shows a side view of the nut retention device 2 of FIG. 6 in conjunction with assembled nut 70 and threaded member 80, as used in connecting a first gas turbine component 502 and a second gas turbine component 504. One skilled in the art will appreciate, of course, that additional assembly components, such as washers, etc. may be used in conjunction with nut retention device 2, nut 70, and threaded member 80.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nut retention device comprising:

a body having a nut engaging opening; and a deformable strap extending from the body, wherein, in an operative state, the nut engaging opening immovably receives a nut that is threaded on a threaded member and the strap is fixedly engaged to the threaded member through a notch in a distal end of the strap to retain the nut.

2. The nut retention device of claim 1, wherein the strap includes a first strap having a first notch and a second strap having a second notch, the first and second straps positioned substantially opposite each other with respect to the body.

3. The nut retention device of claim 2, wherein the first notch and the second notch, together, form a notch opening having a diameter that is less than a diameter of the nut engaging opening.

4. The nut retention device of claim 1, wherein the strap includes a slot.

5. The nut retention device of claim 4, wherein at least a portion of the slot has a width that is less than a diameter of the nut engaging opening and is positioned above the nut engaging opening in the operative state.

6. The nut retention device of claim 1, wherein the strap includes a strap opening along at least a portion of a length of the strap, the strap opening having a width that is less than a diameter of the nut engaging opening.

7. The nut retention device of claim 1, wherein the threaded member is part of a mounting system of a component of a gas turbine.

8. The nut retention device of claim 1, wherein, in an inoperative state, the body and the deformable strap are coplanar.

9. The nut retention device of claim 1, wherein the strap is fixedly engaged to the threaded member by a weld.

10. The nut retention device of claim 1, wherein the strap includes a first strap and a second strap, the first and second straps positioned substantially opposite each other with respect to the body.

11. A nut retention system for retaining a nut on a threaded member coupling to a component of a gas turbine, the nut retention system comprising:

a body having a nut engaging opening; and a deformable strap extending from the body, wherein, in an operative state, the nut engaging opening immovably receives the nut that is threaded on the threaded member coupling to the component and the strap is fixedly engaged to the threaded member through a notch in a distal end of the strap to retain the nut.

12. The system of claim 11, wherein the strap includes a first strap having a first notch and a second strap having a second notch, the first and second straps positioned substantially opposite each other with respect to the body.

13. The system of claim 12, wherein the first notch and the second notch, together, form a notch opening having a diameter that is less than a diameter of the nut engaging opening.

14. The system of claim 11, wherein the strap includes a slot having a width that is less than a diameter of the nut engaging opening and is positioned above the nut engaging opening in the operative state.

15. The system of claim 11, wherein the strap includes a strap opening along at least a portion of a length of the strap, the strap opening having a width that is less than a diameter of the nut engaging opening.

16. The system of claim 11, wherein, in the operative state, the body exerts a force onto the nut.

17. The system of claim 11, wherein the component includes a combustion component of the gas turbine.

18. The system of claim 17, wherein the component includes a transition piece of the gas turbine.

19. The system of claim 11, wherein the strap is fixedly engaged to the threaded member by a weld.

20. The system of claim 11, wherein, in a non-retaining, removed state, the strap is removed from being fixedly engaged with the threaded member to allow removal of the nut from the threaded member without substantial destruction of the nut or the threaded member.

* * * * *